United States Patent
Cottrill

[19]

[11] Patent Number: 5,963,958
[45] Date of Patent: Oct. 5, 1999

[54] METHOD AND SYSTEM FOR GENERATING OBJECT DEFINITIONS

[75] Inventor: Scottie L. Cottrill, The Colony, Tex.

[73] Assignee: Electronic Data Systems Corporation, Plano, Tex.

[21] Appl. No.: 08/897,081

[22] Filed: Jul. 18, 1997

[51] Int. Cl.⁶ .................................................... G06F 9/00
[52] U.S. Cl. ........................................ 707/104; 707/100
[58] Field of Search ........................................ 707/1–205

[56] References Cited

U.S. PATENT DOCUMENTS

| | | | |
|---|---|---|---|
| 5,297,279 | 3/1994 | Bannon et al. | 707/103 |
| 5,437,027 | 7/1995 | Bannon et al. | 707/103 |
| 5,553,218 | 9/1996 | Li et al. | 707/102 |

*Primary Examiner*—Thomas G. Black
*Assistant Examiner*—John G. Mills, III
*Attorney, Agent, or Firm*—L. Joy Griebenow; Baker & Botts L.L.P.

[57] ABSTRACT

A computer network (10) is provided that includes a server (14) with a database (28) and an object definition generator (33). The database (28) stores a plurality of objects. The object definition generator (33) receives user input identifying a selected one of the objects and generates output code (37) including an object definition for the selected object. A client (12) includes a first application (26) operable to utilize the database (28). A second application (32) utilizes the output code (37) to access the database (28). The object definition generator (33) provides an automated method for enabling the second application (32) to utilize objects stored in the database (28).

7 Claims, 2 Drawing Sheets

METHOD AND SYSTEM FOR GENERATING OBJECT DEFINITIONS

TECHNICAL FIELD OF THE INVENTION

This invention relates generally to the field of computer systems and more particularly to a method and system for generating object definitions.

BACKGROUND OF THE INVENTION

In object-oriented programming environments, the use of object databases rather than relational databases to organize, store and retrieve objects is well known. In a local area network (LAN) it is often advantageous for an object database and an application utilizing the object database to reside on separate computer systems, to exploit the well-known advantages offered by distributed computing systems.

To maximize the utility of an object database, it would be advantageous if several different applications operating within the network were able to utilize the object database. However, to utilize the object database, an application must first be provided with object definitions for the objects stored in the database. Applications implemented on separate computer systems, and developed in disparate development environments or different programming languages, cannot easily share object definitions. Thus, once an application is developed to utilize objects in an object database, later-developed applications typically cannot utilize the same objects in the database unless a translated set of object definitions is manually created for each application. This significantly decreases the benefit of creating and maintaining an object database.

SUMMARY OF THE INVENTION

From the foregoing, it may be appreciated that a need has arisen for an object definition generator capable of producing object definitions from a database for use by network applications. In accordance with the present invention, an object definition generator is provided which substantially eliminates or reduces disadvantages and problems associated with conventional network database systems.

According to an embodiment of the present invention, there is provided a computer network with a server computer system that includes a database and an object definition generator. The database stores a plurality of objects. The object definition generator receives user input identifying a selected one of the objects and generates output code including an object definition for the selected object. A client computer system includes a first application operable to utilize the database. A second application utilizes the output code to access the database.

The present invention provides various technical advantages over conventional network database systems. For example, one technical advantage is that the object definition generator provides an automated method for enabling software applications to utilize objects stored in a database. Another technical advantage is that the object definition generator can translate an object definition retrieved from the database into the programming language of the second application. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
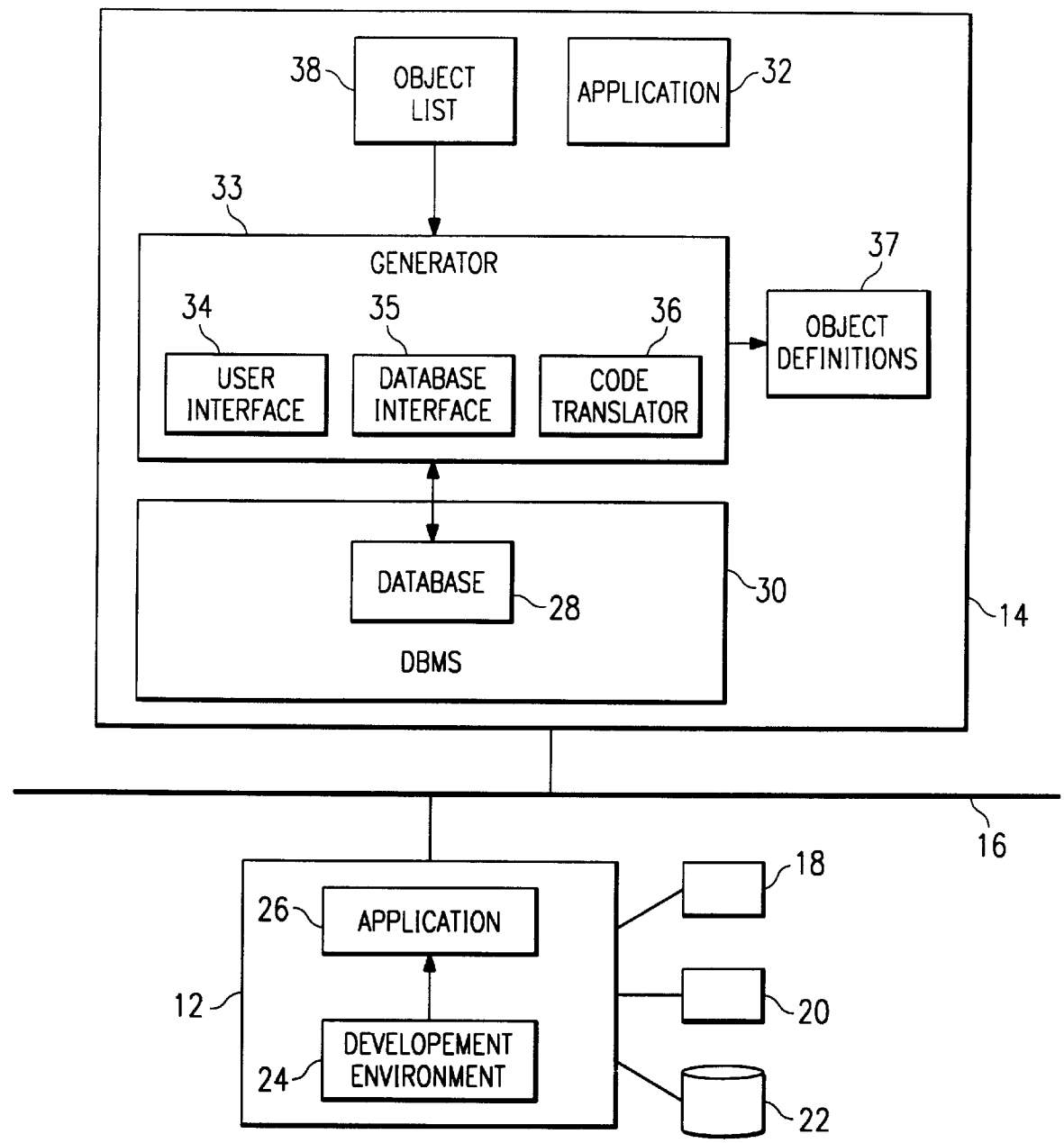
FIG. 1 is a block diagram of an exemplary computer network constructed in accordance with the invention.

Referring to FIG. 1, a local area network (LAN) 10 constructed in accordance with the present invention is shown. LAN 10 includes a client computer system 12 and a server computer system 14 connected by a network bus 16. Client computer system 12 and server computer system 14 may each comprise a workstation, IBM-compatible personal computer, or other computer system.

Client computer system 12 includes an input system 18, an output system 20 and a mass storage system 22. Input system 18 is operable to receive input from a user of client computer system 12, and may comprise a keyboard, a pointing device such as a mouse or touchpad, or other input devices. Output system 20 is operable to produce audiovisual output for a user of client computer system 12, and may comprise a monitor, speakers, printer, or other output devices. Mass storage system 22 is operable to store and retrieve data, and may comprise a hard disk drive, floppy disk drive, CD-ROM drive, or other mass storage device.

Client computer system 12 also includes a development environment 24, which allows a user to interactively create a client application 26. Development environment 24 may comprise a commercially available development environment such as Smalltalk™ or Microsoft Visual C++™. Development environment 24 provides an object-oriented programming language such as Smalltalk, C++ or OBJECTIVE PASCAL, as well as a compiler or interpreter for that language. Development environment 24 may also provide a graphical user interface to assist in the construction of source code.

The client application 26 created using development environment 24 may for example be an MS-DOS™- or Windows™-based application. Client application 26 utilizes a database 28 resident on server computer system 14. Client application 26 includes source code that provides definitions for objects in database 28. For example, client application 26 may include the Smalltalk code listed in Example A to define an "Account" object.

Server computer system 14 includes database 28 and a server application 32 which is designed to use some of the objects in database 28. Server application 32 may, for example, be written in the well-known C++ programming language. Server application 32 does not include the object definitions necessary to properly utilize objects in database 28.

Database 28 may be an object database created and maintained using an object database management system (ODBMS) 30 such as GemStone™ or the Unisys Universal Repository™. Alternatively, database 28 may be a relational database created and maintained using a commercially available relational database management system (RDBMS) and adapted for the storage of objects.

An object definition generator 33 in accordance with the present invention is operable to create an object definition file 37 for server application 32. Object definition generator 33 comprises a user interface 34, a database interface 35 and a code translator 36. The operation of object definition generator 33 will be described more fully below in connection with FIG. 2. Object definition file 37 includes object definitions for objects identified by a user either in an interactive input process or in an input file 38, as will be discussed more fully below.

Figure 2:
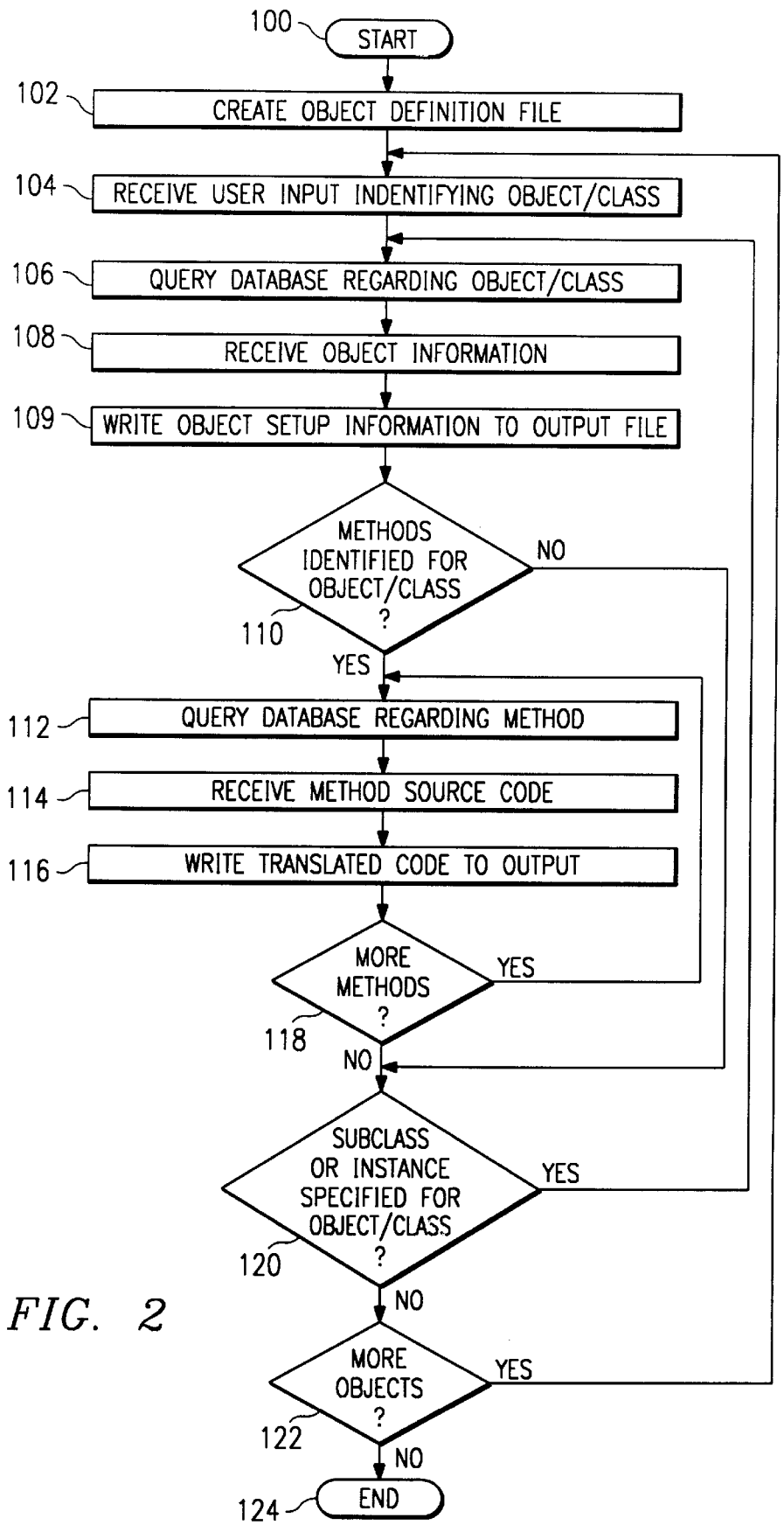
FIG. 2 is a flowchart illustrating a method of generating object definitions in accordance with the present invention.

Referring to FIG. 2, a flowchart illustrating the operation of object definition generator 33 is shown. When a user executes object definition generator 33, its software performs a process that begins at step 100. The user may, in the execution command, specify an input file 38 to be used as input during the execution of object definition generator 33. The user may also specify an output file name for object definition file 37 which will be created during the execution of object definition generator 33.

At step 102, object definition generator 33 creates object definition file 37. If the user specified an output file name at execution, then object definition file 37 is created using that file name. Otherwise, a default file name, such as "OBJDEF.OUT" is used for object definition file 37.

Proceeding to step 104, user interface 34 receives a user input set identifying an object class or instance stored in database 28. If the user specified an input file 38 at execution, then user interface 34 reads input file 38 to retrieve the identification of the first object class or instance listed in input file 38. If no input file was specified at execution, then user interface 34 prompts the user to identify an object class or instance stored in object database 28.

User interface 34 may, for example, provide through a graphical user interface (GUI) a list of object classes and instances stored in database 28. The user may then select one of the listed classes or instances using a mouse, touchpad or other pointing device. Alternatively, user interface 34 may provide no guidance to the user in choosing an object class or instance, and may simply allow the user to name an object class or instance using a keyboard or other input device.

The method then proceeds to step 106, where database interface 35 queries database 28 regarding the object class or instance identified in step 104. For example, if database 28 is created using the Unisys Universal Repository™ DBMS 30, then database interface 35 queries a meta data services function of DBMS 30 using the name of the selected object class or instance. In response, the meta data services function returns a list of variables, methods and/or subclasses associated with the selected object class or instance. This information is received by database interface 35 at step 108.

At step 109, object definition generator 33 writes certain object definition information to object definition file 37 in response to the object information received at step 108. The information written to object definition file 37 depends on the type of object class or instance that was the subject of the query in step 106. The information written to object definition file 37 also depends on the object-oriented language in which server application 32 is written.

Preferably, the information written to object definition file 37 at step 109 includes a declaration of the object in question and the variables received by database interface 35 at step 108. This object declaration is written in the language of server application 32. If the language of server application 32 is different from the language of client application 26, code translator 36 is operable to translate the object definition information received by database interface 34 at step 108 into an object declaration appropriate to the language of server application 32. This translated object declaration is written to object definition file 37.

An exemplary object definition file 37, written in C++, is reproduced below in Example B. This exemplary object definition file is produced by object definition generator 33 when the "Account" object created by the Smalltalk code set forth in Example A is selected by the user at step 104. The "class Account" declaration appearing in Example B represents C++ code written to object definition file 37 at step 109. This code includes a declaration of the "Account" class and the "balance" and "account" variables.

At step 110, object definition generator 33 determines whether the object information received at step 108 includes any methods. If not, then object definition generator 33 proceeds to step 120, which will be described more fully below.

If the object information received at step 108 does include one or more methods, then at step 112, database interface 35 queries database 28 regarding the first method identified in step 108. For example, if DBMS 30 is a Unisys Universal Repository™, then database interface 35 queries the meta data services function of DBMS 30 using the name of the selected method. In response, the meta data services function returns a set of source code for the selected method. The source code, which is written in the language of development environment 24, in this example Smalltalk, is received by database interface 35 at step 114.

Proceeding to step 116, object definition generator 33 writes the source code received at step 114 to object definition file 37. If the language of client application 26 is different from the language of server application 32, then code translator 36 first translates the source code received at step 114 into the language of server application 32, in this example C++, before the code is written to object definition file 37. Code translator 36 translates the source code according to well-known equivalencies between the language of client application 26 and the language of server application 32. For example, the Smalltalk source code appearing in Example A:

```
balance
    "Returns the current balance for anAccount"
    ^balance
``` may be translated to create an equivalent method in C++, appearing in Example B:

```
int Account::balance(void)
{
    return(balance);
}
```

This translated method performs the same function as the original method written in Smalltalk. Although the translated C++ code is shown without the text comment that appears in the original Smalltalk code, code translator 36 may also be operable to transfer comments with appropriate comment markers into object definition file 37.

Another exemplary method equivalence is shown with respect to the balance-setting method beginning with "balance: anAmount" in Example A, the translated method beginning with "void Account::balance(int bal)" in Example B. Likewise, the "credit," "debit," "depositFunds" and "withdrawFunds" methods appear in Smalltalk code in Example A and in C++ code in Example B. Because these latter methods are implemented by subclasses of the "Account" class, as shown in Example A, blank or inoperative methods appear in the equivalent C++ code in Example B. Thus, server application 32, when executed, will look to the subclasses of the "Account" class to find instructions for completing these methods.

After the translated method source code has been written to object definition file 37, object definition generator 33 determines at step 118 whether any more methods have been identified for the object class or instance identified at step 104. If so, then object definition generator 33 returns to step 112, where database 28 is queried regarding the next identified method. This loop continues until all methods identified for the selected object class or instance have been written into object definition file 37.

Object definition generator 33 then proceeds to step 120, where it is determined whether information regarding any subclasses or instances of the selected object class or instance was received at step 108. If so, then object definition generator 33 returns to step 106, where database 28 is queried regarding the subclass or instance in the same way that information was gathered with respect to the original object class or instance identified at step 104. Thus, information is gathered and written to object definition file 37 for each class, subclass and instance of the object identified at step 104.

When all possible information regarding the first object identified at step 104 has been gathered, translated and written to object definition file 37, user interface 34 determines at step 122 whether the user wishes to include any more objects in object definition file 37. If the user specified an input file 38 at execution, then input file 38 is read to determine whether another object class or instance is listed in input file 38. If no input file was specified at execution, then user interface 34 prompts the user to indicate whether the user wishes to identify another object class or instance stored in object database 28.

If at step 122 user interface 34 determines that the user wishes to identify another object class or instance, then object definition generator 33 returns to step 104, where the next object class or instance is identified. Information regarding the object class or information is then gathered and written to object definition file 37, as previously described. If the user chooses not to identify any further objects, then the method proceeds to step 124, where object definition generator 33 terminates execution.

While the invention has been particularly shown and described by the foregoing detailed description, it will be understood by those skilled in the art that various other changes in form and detail may be made without departing from the spirit and scope of the invention which is solely defined by the appended claims. In particular, it will be understood by those skilled in the art that, while reference has been made to particular network configurations, operating systems, applications and file formats, the principles of the invention can be applied more generally to other types of computer systems, applications and formats.

EXAMPLE A

```
Model subclass: #Account
   instanceVariableNames: 'balance acctNumber'
   classVariableNames: ' '
   poolDictionaries: ' '
   category: 'ATM Tutorial'
acctNumber
   "Returns the acctNumber for anAccount"
   ^acctNumber
acctNumber: aBytestring
   "Sets the acctNumber for anAccount"
   acctNumber := aByteString.
   ^self
balance
   "Returns the current balance for anAccount"
   ^balance
balance: anAmount
   "Sets the current balance for anAccount"
   balance := anAmount.
   ^self.
credit: anAmount
   "This responsibility should be implemented by
      subclasses"
   self subclassResponsibility.
   ^'self.
debit: anAmount
   "This responsibility should be implemented by
      subclasses"
   self subclassResponsibility.
   ^self.
depositFunds: anAmount
   "This responsibility should be implemented by
      subclasses"
   self subclassResponsibility.
   ^self.
withdrawFunds: anAmount
   "This responsibility should be implemented by
      subclasses"
   self subclassResponsibility.
   ^self
initialize
   "Initialize anAccount's instance variables"
   self acctNumber: ' '.
   self balance: 0.
   ^self.
handleError: aByteString
   "Display the error string in a dialog box."
   Dialog warn: aBytestring.
   ^self.
Account class
   instanceVariableNames: ' '
new
   "Create a new instance of Account and initialize"
   ^super new initialize.
```

EXAMPLE B

```
OBJDEF.OUT
class Account {
   int balance;
   char * account;
public:
   char * acctNumber(void);
   void acctNumber(char*);
   int balance(void);
   void balance(int);
   void credit(int);
   void debit(int);
   void depositFunds(int);
   void withdrawFunds(int);
   Account();
   ~Account();
   void handleError(char *);
};
char * Account::acctNumber(void)
{
   return(account);
}
void Account::acctNumber(char * acct)
{
   strcpy(account, acct);
}
int Account::balance(void)
{
   return(balance);
}
void Account::balance(int bal)
{
   balance = bal:
}
void Account::credit(int amt)
```

```
{
}
void Account::debit(int amt)
{
}
void Account::depositFunds(int amt)
{
void Account::withdrawFunds(int amt)
{
}
void Account::handleError(char * message)
{
   cerr << message << endl;
}
void Account::Account(void)
{
   account = new char[20];
}
```

What is claimed is:

1. A computer network, comprising:
a server computer system having a database and an object definition generator, the database being operable to store a plurality of objects, the object definition generator being operable to receive user input identifying a selected one of the objects, and operable to automatically generate a second object definition for the selected object based on a first object definition for the selected object;
a client computer system having a first application operable to utilize the first object definition to access the selected object in the database; and
a second application operable to utilize the second object definition to access the selected object in the database.

2. The computer network of claim 1, wherein the server computer system includes the second application.

3. The computer network of claim 1 and further comprising a second client computer system, the second client computer system including the second application.

4. A method for providing access to a database, comprising the steps of:
receiving a user input set identifying an object stored in the database;
in response to the user input set, obtaining from the database a first object definition for use by a first application to access the object;
in response to the object definition obtained from the database, automatically creating a second object definition based on the first object definition for use by a second application to access the object; and
the second application utilizing the second object definition to access the selected object.

5. The method of claim 4, wherein the step of receiving the user input set comprises the step of reading the user input set from an input file.

6. The method of claim 4, wherein the step of obtaining the first object definition comprises the step of querying the database regarding the object.

7. The method of claim 4, wherein the step of creating the second object definition comprises the step of translating the first object definition.

* * * * *